United States Patent [19]

Barrett et al.

[11] Patent Number: 5,166,251
[45] Date of Patent: Nov. 24, 1992

[54] DRAWABLE CORROSION INHIBITING COATING

[75] Inventors: L. Donald Barrett, Cleveland Heights, Ohio; Burkhard Flamme, Hagen, Fed. Rep. of Germany; Dale R. Hahn, Union Lake; Peter E. Pelloski, Ferndale, both of Mich.

[73] Assignee: Depor Industries, Inc., Birmingham, Mich.

[21] Appl. No.: 551,431

[22] Filed: Jul. 11, 1990

Related U.S. Application Data

[63] Continuation of Ser. No. 4,677, Jan. 20, 1987, abandoned, and a continuation of Ser. No. 729,637, Aug. 8, 1988, abandoned.

[51] Int. Cl.$^5$ .............................................. C08K 3/08
[52] U.S. Cl. ..................................... 524/439; 524/407; 524/413; 524/434; 524/435; 524/436; 524/440; 524/441; 524/462; 524/546
[58] Field of Search ............... 524/441, 407, 413, 434, 524/435, 436, 439, 441, 440, 462, 546

[56] References Cited

U.S. PATENT DOCUMENTS

| | | | |
|---|---|---|---|
| 4,098,749 | 7/1978 | Hoshino et al. | 524/441 |
| 4,358,510 | 11/1982 | Ito et al. | 524/441 |
| 4,391,855 | 7/1983 | Geeck | 524/233 |

FOREIGN PATENT DOCUMENTS 8202393  7/1982  PCT Int'l Appl. ................. 524/441

Primary Examiner—Joseph L. Schofer
Assistant Examiner—Peter P. Mulcahy
Attorney, Agent, or Firm—Barnes, Kisselle, Raisch, Choate, Whittemore & Hulbert

[57] ABSTRACT

A corrosive resistant coating with deep drawability characteristics which is applied to a metal substrate as a wet film and then heated to dry and initiate curing to provide a protective coating tenaciously bonded to the substrate. The composition has a corrosion inhibiting powder metal, a drawing agent of polytetrafluorethylene (PTFE), a primary bonding resin, and a vehicle of solvents. Preferably, the coating composition also has a secondary organic resin and thixotropic, metal suspension and hydroscopic agents. The cured coating composition on a metal substrate, in most instances, eliminates the needs for additional die drawing compounds when deep cold drawing the coated metal substrate.

18 Claims, No Drawings

DRAWABLE CORROSION INHIBITING COATING

This is a continuation of application Ser. No. 07/729,637, filed on Aug. 8, 1988 now abandoned as a continuation of application Ser. No. 07/004,677 filed on Jan. 20, 1987 and now abandoned.

FIELD OF THE INVENTION

This invention relates to coatings for metal substrates and more particularly, to a deep drawable, corrosion inhibiting coating for a metal substrate.

BACKGROUND OF THE INVENTION

Many processes and coatings have been developed for protecting metal substrates, and particularly plain carbon steel substrates, from direct and electrochemical corrosion. Previously, metal substrates have been protected in varying degrees by applying organic and metal coatings such as phosphate, paint, plastic resins, zinc, lead, stainless steel, aluminum and the like.

Geeck U.S. Pat. No. 4,391,855 discloses an effective corrosion resistant coating for a metal substrate. This coating has a corrosion inhibiting finely powdered metal dispersed in a phenoxy resin organic bonding material and solvents. In this coating powdered zinc, cadmium, stainless steel and aluminum are all suitable corrosion inhibitors, although zinc is preferred for steel substrates.

Corrosion resistant coatings are used in a variety of applications. Most applications require additional die drawing compounds applied over the coated metal substrate when it is to be cold drawn into different shapes for the purpose of not only permitting the drawing operation, but also for preventing the destruction of the coating film.

Various drawing agents have also been mixed with liquid paint applied to metal substrates to increase its drawability so that usually limited or sometimes even no additional die drawing compound is required to be applied over the paint to permit a drawing operation which is not deep or severe. However, the addition of such agents to a coating having a powdered metal for inhibiting corrosion, such as the coating of U.S. Pat. No. 4,391,855, renders ineffective or greatly retards and usually destroys its corrosion inhibiting properties.

SUMMARY OF THE INVENTION

In a coating of this invention, a drawing agent, polytetrafluorethylene (PTFE), and a primary corrosion inhibitor of a finely divided metal are dispersed in a primary bonding resin material and a blend of solvents. Preferably, the coating is initially adhered to the metal substrate by a secondary resin until the primary resin is cured to bond and tenaciously adhere a dry film of the coating to the substrate. When a high degree of chemical resistance is desired, it can be achieved by utilizing primary and secondary resins which cross link when cured while still maintaining a degree of flexibility. Preferably, a thin and uniform dry film is produced on the substrate by including a thixotropic agent, premature curing of the primary bonding material is prevented by a hygroscopic agent, and the finely divided metal is prevented from settling out by a suspension agent.

Objects, features and advantages of this invention are to provide a corrosion resistant finely divided metal coating and method which can be deep drawn cold with little and usually no additional die drawing compounds while maintaining its corrosion resistance, has improved corrosion resistance, improved adhesion to a metal substrate and improved abrasion resistance, permits coated substrates to be welded together, can be readily, easily and economically applied in one coat, readily and easily cured at a relatively low elevated temperature in a relatively short period of time, and is stable, rugged, durable and economical.

These and other objects, features and advantages of this invention will be apparent from the following detailed description and appended claims.

DETAILED DESCRIPTION OF THE INVENTION

In this invention, a thin layer of a corrosion resistant coating in a liquid form is applied to a metal substrate such as by dipping, rolling, brushing, spraying or the like. To convert the liquid layer to a solid dry film and to bond and tenaciously adhere the dry film to a metal substrate, the liquid layer is heated to an elevated temperature for a relatively short period of time. The heating evaporates solvents in the liquid layer and initiates curing of a primary bonding resin to provide a dry, thin, uniform, drawable and protective film or coating permanently adhered to the substrate. In resin systems capable of cross linking, this heating and curing also cross links the primary and secondary resins to improve the chemical resistance of the dry film.

Active and Passive Corrosion Inhibiting Metals

In the composition of the coating, the primary corrosion inhibitor is believed to be a finely divided metal. To provide cathodic protection against galvanic corrosion of the metallic substrate, the finely divided metal is sufficiently anodic or high enough in the galvanic series to act as an anode in a couple with the substrate. For a substrate of iron or steel suitable anodic finely divided metals are magnesium, zinc, cadmium, aluminum and the like. For most applications, finely divided zinc is preferred because when exposed to the atmosphere, such as when the coating is scratched, it forms a self protecting film of fairly impermeable basic corrosion or oxidation products which protect the substrate from further attack. Chromates and phosphates may also be incorporated to reduce the cathodic activity of the above mentioned metals so as to extend the corrosion life of the substrates. However, where a coating with an extremely low coefficient of friction is desired, such as on bolts and nuts to provide an improved and consistent torque-tension relationship, flaked metals such as aluminum, nickel, stainless steel and copper may be used along with or in lieu of zinc. If these pigments are used in lieu of zinc, they function principally in a mechanical role in preventing corrosion. With sufficient volume concentrations of these pigments, they slow the transfer of moisture, electrolytes and oxygen through the dry film.

Preferably, the finely divided metal is a powdered metal having an average particle size of less than 60 microns, desirably less than 40 microns, and preferably less than 20 microns and a maximum individual particle size desirably not more than 100 microns. Preferably, the powdered metal has an average particle size in the range of about 2 to 15 microns with a maximum individual particle size of about 30 to 60 microns. Suitable powdered metals are commercially available from various sources. Powdered zinc can be purchased from Purity Zinc Company of Toronto, Canada under the grade designations 510 and 515, and from the Federated Metals Division of American Smelting And Refining Company of 901 Oak Tree Road, South Plainfield, N.J. under the grade designations L-10 and L-15. Powdered magnesium can be purchased from the Federated Metals Division under the grade designations L-10 and L-15. Powdered aluminum can be purchased from the Reynolds Metals Company of Louisville, Ky. under the trade designation 8-232. Although nonleafing grades of aluminum are preferred for most applications, leafing grades may also be used.

Drawing Agent

Polytetrafluorethylene (PTFE) is believed to be the only drawing agent which will maintain the corrosion resistance of the coating and allow coated metals to be cold drawn into shapes and be severely deformed with little and in most instances no die drawing compound being used, while also preventing destruction of the coating film during the drawing process. Particles of PTFE arend dispersed in the dry film coating as adhered to a metal substrate.

Desirably, the PTFE has particles of a size equal to about 1 to 100 microns, desirably 1 to 60 microns and preferably 1 to 20 microns. The coating composition contains a quantity of PTFE drawing agent equal to about 1% to 25% by weight of the total solids, desirably 1% to 10%, and preferably 2% to 4%. Suitable PTFE is availabe from Micro Powder, Inc. of Scarsdale, N.Y. as Fluo-HT-1.

Primary Bonding Resin

In the coating a variety of primary bonding resin systems can be used with the PTFE agent to achieve the deep drawability characteristic while maintaining excellent corrosion protection. Suitable primary bonding resins are epoxy, phenoxy, alkyd, saran, vinyl toluated alkyd, polyester, isocyanate and acrylic.

The preferred primary bonding resin is a thermoplastic linear epoxy or phenoxy resin having a molecular weight in the range of about 3,000 to 70,000 with an average molecular weight of 40,000-60,000 preferred prior to curing. This linear epoxy or phenoxy resin is produced by an epichlorohydrin bisphenol-A reaction. This phenoxy resin has a high molecular weight with many hydroxyl groups and few terminal epoxy groups which are highly reactive. Suitable phenoxy resins are commercially available from Reichold Chemicals, Detroit, Mich. as Rekloid 38-525 and from Union Carbide, New York, N.Y., as PKHH. Ciba-Geigy phenoxy resins are preferred because they are believed to produce coatings having the best adhesion characteristics.

A suitable expoxy resin is commercially available from Ciba-Geigy, Ardsley, N.Y., as 497-C55. An alkyd resin is commercially available from Spensor Kellog, Buffalo, N.Y., as Aroploz 6230Al-90. Saran is commercially available from Dow Chemical Co., Midland, Mich. Vinyl toluated alkyd resin is commercially available from Spencer Kellog, Buffalo, N.Y., as Kelysol 719-60E. Isocyanate resin is commercially available from Mobay Chemical, Pittsburg, Pa. Acrylic resin is commercially available from Rohm & Haas, Philadelphia, Pa. as Acryloid B-72 and Acryloid B-66X.

Secondary Resin

The corrosion inhibiting properties of the composition, particularly its resistance to salt spray, are improved by the addition of secondary corrosion inhibiting resins. These secondary resins also increase the resistance of the coating to certain solvents such as brake fluid and gasoline. Suitable secondary resins are phenolic, resole, triazine, melmamine-formaldehyde, ketimines, urea-formaldehyde amino, titanates and hexomethoxymethyl-melamine resins. Suitable secondary resins available from Riechold Chemical Company, Detroit, Mich., are melamine-formaldehyde (MM-55 RCI, MM-83-RCI, MM-46RCI, MM-47-RCI), urea-formaldehyde (F-200-E RCI, F-222-E RCI, F-240-E RCI), benzoguanamine (MX-61 RCI), and phenolic (Varcum 2381-B). A suitable hexomethoxymethyl-melamine resin is available from American Cyanamid Co. (Cymel 300, Cymel 302). Suitable phenolic and resole resins are available from Union Carbide Corporation (BKR-2620), Ciba-Geigy Corp. (HZ-949-U), and General Electric Co. (Methylon 75108, Methylon 75202).

In the composition, these secondary resins may comprise about 1% to 50% by weight of the primary bonding resin and desirably, about 5% to 30% and, preferably 10% to 15% by weight of the primary bonding resin. The adhesion characteristics of the coating tend to be degraded in forming if significantly more than about 50% by weight of these corrosion inhibitng resins are used. Thus, at least 50% by weight of the total resin system should consist of primary bonding resin.

The total amount of resin (primary bonding resin plus any secondary corrosion inhibiting resins) of the composition may be in the range of about 10% to 525% by weight of the metallic powder, more desirably, in the range of about 12% to 100% by weight, and preferably, in the range of about 14% to 50% by weight of the metal powder.

Thixotropic Agent

Preferably, to insure that the coating does not gel prior to application to a substrate and that it has suitable flow and wetting characteristics around edges of the substrate, the coating contains a thixotropic agent. A suitable thixotropic agent is silane treated silica dioxide. An appropriate amount of this thixotropic agent is believed to also modestly improve the salt spray corrosion resistance of the coating but an excess amount is believed to produce a porous thin coating having a deleterious effect on corrosion resistance. The amount of this thixotropic agent in the coating may be about 0.4–12% by weight of the powdered metal and preferably about 1–6% by weight of the powdered metal. Silane treated silica dioxide thixotropic agents are commercially available from Tulco Corporation of Faulknes Street, North Billerica, Mass. as Tullanox 292 and 500, Cabot Inc. of Detroit, Mich. as Cabosil M-5, DeGussa Corporation of PO Box 2004, Tetesboro, N.J. as R-972, and Pittsburgh Paint and Chemical Co. of One Gateway Center, Pittsburgh, Pa. as Hi-sil 600.

Suspension Agent

Preferably, a suspension agent is used to ensure that the powdered metal does not settle out of the coating composition and form a hard cake. A suitable suspension agent is polyethylene which can be purchased as Suspensol 220 from Poly-Resyn, Inc. of West Dundee, Ill., and as MRT-1 from Matteson-Rudolfi, Inc. of Detroit, Mich. Suspensol 220 is essentially one part polyethylene in three parts xylene by weight. MRT-I is also believed to be essentially one part polyethylene in three parts xylene by weight. The amount of polyethylene used as a suspension agent may be about 0.2–5% by weight of the metal powder and preferably about 0.4–2.6% by weight of the metal powder. This is equivalent to about 0.8–20% and 1.6–10.4% by weight, respectively, of the Suspensol 220.

Hygroscopic Agent

Preferably, the coating contains a water scavenger or hydroscopic agent. Suitable hygroscopic agents are calcium oxide, silica dioxide, barium oxide, and potassium chloride. A suitable silica dioxide is commercially available from Davidson Chemical Co. of Baltimore, Md. as Syloid AL-1 and Syloid ZN-1. The amount of hygroscopic agent in the coating composition may be 0.2% to 12% by weight of the powdered metal and preferably, about 0.4% to 6% by weight of the powdered metal. An excess amount of hygroscopic agent is believed to decrease the corrosion resistance of the coating.

Vehicle

The vehicle or carrier of the coating composition contains active and inactive solvents that are compatible with the resins. Active solvents are those that actually dissolve the resin and inactive solvents are those used to thin the composition.

Suitable active solvents for epoxy and phenoxy resins are cellosolve acetate, dibasic ester, methyl ethyl ketone, methyl isobutyl ketone, dimethylformamide and acetone. A suitable active solvent for alkyd resins is xylene. A suitable active solvent for saran resins is methyl ethyl ketone. Suitable active solvents for vinyl alkyd are xylene and toluene. A suitable active solvent for polyester resins is naphtha. Suitable active solvent for isocyanate resins is propylene glycol. Suitable active solvents for acrylic resins are xylene, and toluene.

Suitable inactive solvents for epoxy, phenoxy, polyester and isocyanate resins are aromatic hydrocarbons such as xylene and toluene. Suitable inactive solvents for alkyd, saran and acrylic resins are acetates.

Suitable aromatic hydrocarbon solvents are commercially available from Chem-central of 13395 Huron River Drive, Detroit, Mich. as SC 100 and SC 150 and Ashland Chemicals of Detroit, Mich. as Ashland A100 and Ashland A150. The SC 100 solvent has a boiling range of 311° F. to 344° F. and a flash point of 107° F. The SC 150 solvent has a boiling range of 370° F. to 410° F. and a flash point of 151° F.

The vehicle solvent system may consist of about 10% to 40% desirably 15% to 35%, and preferably 25% to 30% by weight of inactive solvents and the balance preferably of active solvents.

The coating composition contains sufficient vehicle solvents to produce the viscosity desired for the particular method of applying the liquid coating to a substrate. The viscosity of the composition in a No. 4 Ford cup is usually in the range of 20–280 seconds, desirably 30–180 seconds and preferably 60–120 seconds. A coating composition viscosity in this range can usually be obtained when the vehicle solvents by weight are about 1/5 to 3 times the weight of all the resins in the composition.

Making the Composition

Preferably, the constituents of the composition are milled with a fraction of the total solvents in a sand mill adjusted and operated to produce a homogeneous mixture with a particle size having a Hegman grind rating of 4.5H to 7.5H. Preferably, the constituents are added in the following order:

| Component | Pounds |
|---|---|
| Resin (phenoxy 488, Ciba Geigy) | 268.8 |
| Calcium Oxide | 1.4 |
| Hygroscopic Agent (AL-1 Davidson Chemical) | 1.4 |
| Suspending Agent (Suspensol 220) | 9.5 |

The above constituents are milled until a temperature in the range of about 110° F. to 180° F. and preferably about 110° F. to 125° F. is achieved and then the following items are added:

| | |
|---|---|
| Zinc Dust (Purity L-10) | 545 |
| Zinc Chromate (Hoescht Chemical) | 7.5 |
| PTFE Fluo-HT-1 Micro Powders) | 13.4 |
| Resol Resin (HZ949 Ciba Geigy) | 9.5 |
| Solvent (SC-150 Chemcentrol) | 40 |
| Solvent (DBE DuPont) | 41 |
| Solvent (P.M. Acetate DuPont) | 109 |

The entire mixture is then milled, preferably while the temperature is maintained at about 110° F. to 125° F. until the Hegman grind rating 4.5H to 7.5H is achieved. A minimum temperature of about 110° F. should be maintained for 15 minutes to optimize th suspending agent properties. The grinding media used is preferably zirconium oxide beads with a particle size of about 10+20 mesh and a density of about 5.4 g/cc. Typically, an appropriate amount by weight of active solvent is usually one to two times the weight of the total resins. This milled composition is then blended with active and inactive solvents compatible with the resin system to produce the desired viscosity.

Using the Composition

In use, a thin wet film of the coating composition is applied to a metal substrate and then cured to provide a dry corrosion resistant protective coating. If needed to facilitate the particular method of application, the viscosity of the coating composition can be further reduced by adding a relatively small amount of compatible solvents which preferably are a mixture of the active and inactive solvents of the vehicle of the coating composition.

After a thin wet film of composition with a wet thickness of about 1 to 4.5 mils is applied to the substrate, the wet film is heated to a relatively low elevated temperature for a sufficient period of time to evaporate the vehicle, thereby drying the film and initiating a reaction bonding the coating to the substrate. The thickness of the dried and cured coating is not more than about 1.5 mils and usually in the range of about 0.3 to 0.8 of a mil. The wet film can be dried by heating it to an elevated temperature for a period of time of about 15 seconds to 90 minutes, desirably about 30 seconds to 50 minutes and preferably 30 seconds to 15 minutes so that the maximum temperature of the substrate is in the range of 200°–500° F., desirably 250°–450° F. and preferably about 300° to 400° F. The maximum temperature for coating terneplate is 500° F. and for electro galvanzied steel the maximum temperature is 425° F.

In practice, the dried and cured coating tenaciously adheres to the metal substrate, provides drawability and prevents corrosion. This is believed to be the only drawable coating which provides excellent protection of the substrate from corrosion without breaking down when cold drawn with no additional die drawing compound or for an extremely deep cold draw with use of a greatly reduced quantity die drawing compound.

Examples

The following examples of the effect of these compositions on the drawability of metal substrates are illustrative of this invention and are not intended to limit the scope of the invention as defined by the appended claims.

The composition described in Example I was also used in subsequent examples except where constituents were substituted as indicated in such examples. Where the primary bonding resin is substituted in an example, a compatible solvent system is also substituted. The composition was applied and adhered to terneplate blank 30/1000 inches in thickness unless otherwise indicated. With the exception of Example IV, the only drawing agent used was PTFE. Where appropriate, the amount of drawing agent used is indicated in each example as a percentage by weight of total solids in the composition.

Example I

A typical formula used in the following examples was essentially as follows:

|  | WT. in Pounds |
| --- | --- |
| Phenoxy Resin (Ciba Geigy, 488) | 171.0 |
| Calcium Oxide | 1.4 |
| Hygroscopic Agent (AL-1, Davidson Chemical) | 1.4 |
| Suspension Agent (Suspensol 220, Poly Resyn) | 9.5 |
| Zinc Dust (Federated Metals) | 545.0 |
| Zinc Chromate (Hoesch Chemical) | 7.0 |
| Resol Resin (HZ-949U, Ciba Geigy) | 9.5 |
| Thixotropc Agent (Tullanox 500, Tulco Corp) | 5.5 |
| PTFE (Fluo-HT-1 Micro Powders) | 20.2 |
| Wetting Agent (Busperse 47, Buckman Laboratories, Detroit, Michigan) | 2.0 |
| Solvent (DBE, Dupont) | 125.7 |
| Solvent (Hi-Sol 150) | 70.0 |

Example II

The deep drawability obtained by a coating composition containing PTFE is demonstrated by a deep drawing test using a limited drawing ratio for comparison. In this test, a circular blank of terneplate, 30/1000 inches thick, is deep drawn in a conventional drawing press. A flat blank is cold formed into a cup by forcing a punch, 4" in diameter, against the center portion of the blank that rest on the die ring and is secured by a blank holder. During the forming of the cup, the outer section of the blank moves radially toward the center of the blank until the remainder of the blank has bent around the punch nose and a straight wall cup is formed. The blank diameter is increased ¼" for each test until the blank tears either at the lip of the die or at the bottom of the cup. The coating which permits the cup to be drawn with the largest diameter blank is considered the most drawable coating.

In this test, the degree of difficulty in drawing a cup is not a straight line function since the area difference of a blank between 8" and 8¼" is not the same as between 9" and 9¼". The degree of difficulty is proportional to the area difference and thus the degree of difficulty increases expontentially with increasing diameter and is much greater between 9" and 9¼" than between 8" and 8¼" blank diameter.

Table I shows the effect of PTFE with different metallic inhibitors.

TABLE I

| Resin | Pigment | % PTFE | Max. blank size that can be drawn |
| --- | --- | --- | --- |
| Phenoxy | Zinc | 0 | 8" |
| " | Zinc | 3 | 9" |
| " | Aluminum | 0 | 8¾" |
| " | Aluminum | 3 | 9" |
| " | Nickel | 0 | 8¼" |
| " | Nickel | 3 | 8¾" |
| " | Stainless | 0 | 8¼" |
| " | Stainless | 3 | 9" |

Example III

To further demonstrate the effectiveness of PTFE, a comparison of draw test results at different concentrations of PTFE was made. Evaluation of these test results used blank diameter, depth of draw at break and appearance to show differences between concentrations. The coated blanks were of plain carbon steel.

TABLE II

| % PTFE | Draw Results |
| --- | --- |
| 0 | Failed 9" blank, drew 1¼", full depth, heavily burnished |
| ½ | Failed 9" blank, drew 2¾" full depth, heavily burnished |
| 1 | Drew 9" blank, full depth draw, moderately burnished |
| 2 | Drew 9" blank, full depth, less burnish |
| 3 | Drew 9" blank, full depth, little burnish |
| 25 | Drew 9¼ blank, full depth, no burnish |

Thus, cold drawability and formability is drammatically improved by a least 1% of PTFE by weight of solids.

Example IV

The enhanced drawability produced by PTFE compared to other potential drawable agents is shown by the following test results:

TABLE III

| Drawable Additive | % | Results |
| --- | --- | --- |
| $MoS_2$ | 3 | Failed 9" blank, drew 1" |
| Polyethylene | 3 | Failed 9" blank-drew 1¼" |
| PTFE | 3 | Drew 9" blank, full depth, little burnish |

PTFE offers drawability that is far superior to other potential agents.

Example V

PTFE adds drawability to coating having a variety of resin systems as demonstrated by the data of Table IV. These coatings were identical in composition except for a change in resin and vehicle and the presence or absence of PTFE. These different coating formulas were applied to blanks, and then dried and cured. The coated blanks were then drawn into cups using increased blank sizes until a cup could no longer be drawn.

Adhesion tests were also performed on blanks of terneplate, 30/1000 inches in thickness, with these coatings thereon. The blanks were uniformly coated across their width and length on one side only with the coatings having the various resins to a dry thickness of 10.25 micrometers to 20.0 micrometers. A dome was formed in each coated blank and a tape was applied over the dome and then rapidly removed The amount of any coating removed by and adhering to the tape was compared to a photographic standard on a scale from 1 to 10 where 10 represents no coating on the tape and hence very high adhesion to the metal blank.

Each dome (or so called Olsen cup), of 7.62 mm in depth was formed by forcing a metal ball against the uncoated side of the test panel and into a semispherical die cavity. The inside diameter of the lower die cavity was 25 mm and the interchangeable upper ball diameter was 25 mm.

Within 20 minutes after forming, 3M tape No. 710, 19 mm wide and 65 mm long, was applied over the dome area and smoothed firmly and uniformly with finger or thumb pressure. The tape was then removed by a firm rapid upward pull (perpendicular to panel) and placed on white paper for better visibility. The tape was compared to Olsen Cup Photographic Standards as described in General Motors Engineering Standard GM-6190-M, which ranks the quantity of the coating appearing on the tape on a scale of 1 to 10, wherein 10 represents no coating on the tape and hence complete adhesion of the coating to the metal panel and 1 represents complete loss of coating from the drawn dome portion of the metal panel to the tape and hence no adhesion of the coating to the metal panel.

TABLE IV
Effect of various resins

| Resin | % PTFE | Max. Blank Diameter That Can Be Drawn | Tape Adhesion In Drawn Area |
|---|---|---|---|
| Epoxy | 0 | 8¼" | 5 |
|  | 3 | 9" | 8 |
| Phenoxy I | 0 | 8" | 8 |
|  | 3 | 9" | 10 |
| Phenoxy II | 0 | 8¼" | 10 |
|  | 3 | 9" | 10 |
| Alkyd | 0 | 8¼" | 5 |
|  | 3 | 9" | 6 |
| Saran | 0 | 8¼" | 10 |
|  | 3 | 9" | 10 |
| Vinyl-Alkyd | 0 | 8¼" | 5 |
|  | 3 | 9" | 5 |
| Polyester | 0 | 8¼" | 5 |
|  | 3 | 9" | 5 |
| Isocyanate | 0 | 8¼" | 3 |
|  | 3 | 9" | 7 |
| Acrylic I | 0 | 8¼" | 4 |
|  | 3 | 9" | 4 |
| Acrylic II | 0 | 8¼" | 5 |
|  | 3 | 9" | 6 |

This test shows use of PTFE does not impair drawability of compositions with various resins and in most instances enhances adhesion of the coating to the substrate.

Example VI

To further demonstrate the enhanced drawability produced by PTFE coatings, the same various resins systems of Example V were applied to strips of sheet steel 2" wide and 18" long. These were then pulled through a device, called a double draw tester. This is a device that clamps a strip and then pulls it between two blocks of steel designed to simulate a draw bead in a die, in accordance with General Motors Engineering Standard GM 9052-P. These blocks are pressure loaded and the pull force can be measured. In this test, the lower the pulling force, the better the drawability value. The test was run using 1000 lbs. of clamp pressure. The test results are set forth in Table V.

TABLE V

| Resin | % PTFE | Steady Pull Force in Pounds |
|---|---|---|
| Epoxy | 0 | 1350 |
|  | 3 | 1150 |
| Phenoxy I | 0 | 1500 |
|  | 3 | 1200 |
| Phenoxy II | 0 | 1400 |
|  | 3 | 1350 |
| Alkyd | 0 | 1600 |
|  | 3 | 1250 |
| Saran | 0 | 1350 |
|  | 3 | 1200 |
| Vinyl Alkyd | 0 | 1500 |
|  | 3 | 1300 |
| Polyester | 0 | 1600 |
|  | 3 | 1350 |
| Isocyanate | 0 | 1350 |
|  | 3 | 1300 |
| Acrylic I | 0 | 1350 |
|  | 3 | 1300 |
| Acrylic II | 0 | 1450 |
|  | 3 | 1300 |

Example VII

The same double draw test of Example VI was also run on the coating of Example I in which the type of metallic inhibitors was varied. This test demonstrates that the PTFE agent increases the drawability without regard to the metal inhibitor used.

TABLE VI

| Metallic Pigment | PTFE | Pull Force in Pounds |
|---|---|---|
| Zinc | 0 | 1500 |
|  | 3 | 1300 |
| Alum. | 0 | 1300 |
|  | 3 | 1200 |
| Nickel | 0 | 1400 |
|  | 3 | 1200 |
| Stainless | 0 | 1300 |
|  | 3 | 1200 |

This test also demonstrated the improved drawability of PTFE coatings.

Example VIII

This example demonstrates that there is no negative effect on adhesion and corrosion resistance by addition of a PTFE drawable pigment.

In the example, the same adhesion test described in Example V was conducted with coatings having the same composition as that of Example I except for modifying the weight percent of PTFE, as indicated in Table VII.

The effect on corrosion of the PTFE was also measured by preparing a blank, 30/1000 inches in thickness, with a coating indicated in Table VII. The coated blank was subjected to an Olsen Cup test in which a metal ball, 22 mm in diameter, was forced into the blank until a dome of 7.62 mm in depth was formed with the coating on the tension side The drawn dome of the blank was then exposed to a 5% neutral salt spray at room temperature, pH adjusted to 6.5-7.2, for 240 hours per General Motors Engineering Standard GM 4298-P. Corrosion resistance was rated by comparing the exposed domes of the blanks to the Olsen Cup Photographic Standards described in Example V. Corrosion resistance was rated on a scale of 1 to 10, wherein represents no coating loss on the drawn dome portion of the blank and hence high corrosion resistance and 1 represents complete coating loss on the drawn dome portion and hence no corrosion resistance.

TABLE VII

| Variable | Adhesion | Corrosion |
|---|---|---|
| Phenoxy, Zinc, 0% PTFE | 9 | 10 |
| Phenoxy, Zinc, ½% PTFE | 10 | 10 |
| Phenoxy, Zinc, 3% PTFE | 9 | 10 |
| Phenoxy, Zinc, 25% PTFE | 9 | 10 |

In this test the primary resin was a phenoxy, the metal pigment was zinc, and the percent of PTFE was varied as indicated.

Example IX

This example demonstrates that the adhesion and corrosion resistance achieved by the addition of a PTFE drawable pigment, is independent of the metal pigment used in the coating.

In this test, the adhesion and corrosion test described in Example VIII were conducted on blanks coated with the composition described in Example I, wherein the metal pigment varied as well as the amount of PTFE as indicated in Table VIII.

TABLE VIII

| Variable | No PTFE | | With 3% PTFE | |
|---|---|---|---|---|
|  | Adhesion | Corrosion | Adhesion | Corrosion |
| Aluminum | 8 | 5 | 10 | 6 |
| Nickel | 8 | 4 | 8 | 5 |
| Stainless Steel | 4 | 2 | 5 | 2 |

Example X

This example demonstrated that the adhesion and corrosion resistance achieved by the addition of PTFE drawable pigment is independent of the resin system used in the coating.

TABLE IX

| Variable | No PTFE | | 3% PTFE | |
|---|---|---|---|---|
|  | Adhesion | Corrosion | Adhesion | Corrosion |
| Epoxy | 5 | 10 | 9 | 10 |
| Phenoxy I | 9 | 10 | 10 | 10 |
| Phenoxy II | 10 | 10 | 10 | 10 |
| Alkyd | 8 | 6 | 8 | 6 |
| Saran | 10 | 10 | 10 | 10 |
| Vinyl Alkyd | 4 | 4 | 5 | 6 |
| Polyester | 6 | 5 | 6 | 5 |
| Isocyanite | 5 | 9 | 8 | 10 |
| Acrylic | 6 | 4 | 6 | 4 |
| Acrylic II | 5 | 4 | 5 | 4 |

These tests therefore show that PTFE has no effect on any particular coating system except that of increasing drawability.

Example XI

This example illustrates that the metal to be coated plays no part in the drawability of the coating film. Increased drawability is shown by comparing metals coated with the PTFE composition and metals coated without the PTFE composition.

In this test, blanks of varying metal composition were coated by the composition described in Example I, wherein the amount of PTFE was varied as 0% or 3% by weight of total solids. The various coated blanks were then passed through the double draw test described in Example VI. The thickness of the aluminum blank was 15/1000 inches and all other blanks were 30/1000 inches thick.

TABLE X

| Metal | % PTFE | Pull Force in Pounds | Clamp Force |
|---|---|---|---|
| Hot Dip Galvanized Steel | 0 | 1600 | 2000 psi |
|  | 3 | 1400 | " |
| Electrogalvanized Steel | 0 | 1400 | " |
|  | 3 | 1050 | " |
| Stainless Steel | 0 | 1400 | " |
|  | 3 | 1200 | " |
| Aluminum | 0 | 1050 | 500 psi |
|  | 3 | 750 | " |
| Hot Dipped Galvanized Steel | 3 | 1050 | 2000 psi |
| Electrogalvanized Steel | 3 | 975 | 2000 psi |

Example XII

This example illustrates that pretreating the metal to be coated plays no part in the drawability of the coating film. Table X illustrates that not only is the drawability of the PTFE coating independent of the metal surface it is applied to, but it is also independent of whether the metal surface is pretreated with conversion coatings such as phosphates, chromates, oxides, etc. prior to applying the PTFE coating. The NR-3, commercially available from Amchem Products, Inc., Ferndale, Mich., provides a chromate coating on the metal surface. The conversion coating is applied by roll coating galvanized steel at room temperature and the concentration is diluted with water to produce a viscosity suitable for roll coating and then drying onto the substrate. The coating promotes corrosion resistance and improves film adhesion similar to phosphate and oxide coatings. Table XI also illustrates that the addition of PTFE either has no effect or reduces the blistering of the applied coating.

TABLE XI

| Substrate | Pretreatment | % PTFE | Adhesion | Blister | Corrosion |
|---|---|---|---|---|---|
| Hot dip Galvanized steel | None | 0 | 9 | Medium | 10 |
| Hot dip galvanized steel | None | 3 | 10 | Few | 10 |
| Hot dip galvanized steel | NR-3 | 0 | 10 | None | 10 |
| Hot dip galvanized steel | NR-3 | 3 | 10 | None | 10 |
| Electrogalvanized steel | None | 0 | 10 | Medium | 10 |
| Electrogalvanized steel | None | 3 | 10 | Few | 10 |
| Electrogalvanized steel | NR-3 | 0 | 10 | None | 10 |
| Electrogalvanized steel | NR-3 | 3 | 10 | None | 10 |

Some Typical Formulations

Example XIII

For most applications, the composition of Example I is the presently preferred composition. However, many variations in the coating composition can be made by using any of the metal inhibitors combined with the different resins and the amount of PTFE can be varied to suit the severity of the draw. For example, a composition can be made in accordance with the following formula where an aluminum pigment is desired to provide a corrosion resistant coating for bolts and nuts to provide fasteners having an improved torque-tension relationship:

| Component | WT. in Pounds |
|---|---|
| Resin (Phenoxy E488, Ciba Geigy) | 375 |
| Calcium Oxide | 3.2 |
| Hygroscopic Agent (Al-1, Davidson Chemical) | 3.2 |
| Suspending Agent (Tullanox 500, Tulco Corp) | 6.5 |
| PTFE (Fluo-HT-1) | 6.7 |
| Suspending Agent (Suspensol 220, Poly-Resyn, Inc.) | 13.4 |
| Aluminum Pigment (Alcan 5250, Alcan Alum) | 101.0 |
| Resol Resin (HZ-949U, Ciba Geigy) | 12.0 |
| Benzoguanamine Resin (MX-61, Reichhold Chemical) | 17.1 |
| Solvent (DBE, Dupont) | 40.5 |
| Solvent (SC-150) | 154.6 |

I claim:

1. A coating composition for application to and curing on a steel substrate to provide a drawable and corrosion resistant dry film protecting the steel substrate, comprising: a finely divided metal of a group consisting essentially of zinc, aluminum, magnesium, cadmium, stainless steel, copper, nickel and alloys and blends thereof; said finely divided metal having an average particle size not greater than about 60 microns and a maximum individual particle size not greater than 100 microns; a resin system at least 50% by weight consisting essentially of primary resin, the quantity of said resin system being about 10% to 525% by weight of said powdered metal and said resin system having the property of curing to a dry film within 50 minutes on a steel substrate at a maximum temperature not greater than 500° F.; a drawable polymeric component consisting essentially of a quantity of a tetrafluorethylene polymer in the form of solid particles equal to at least 1% total solids by weight and which is dispensed as solid particles in the dry film; an active organic solvent and a total quantity of all solvents being sufficient for the composition to have a viscosity in the range of 20 to 280 seconds in a Ford No. 4 cup.

2. The coating composition of claim 1 which also comprises a quantity of a secondary resin equal to about 1% to 50% by weight of said primary bonding resin, said secondary resin comprising at least one of the resins of phenolic, resole, triazine, melamine-formaldehyde, amino, urea-formaldehyde, titanates, ketimines, hexomethoxymethyl-melamine and benzoguanamine resins.

3. The coating composition of claim 1 which also comprises a quantity of a secondary resin equal to about 1% to 50% by weight of said primary bonding resin, said secondary resin consisting essentially of phenolic, resole, triazine, melamine-formaldehyde, amino, urea-formaldehyde, titanates, ketimines, hexomethoxymethyl-melamine, and benzoguanamine resins.

4. The coating composition of claim 1 wherein said primary bonding resin comprises at least one of the resin of the family of epoxy, phenoxy, alkyd, vinylidene chloride, vinyl alkyd, polyester, isocyanate or acrylic.

5. The coating composition of claim 1 wherein said primary bonding resin consists of resins of the family of epoxy, phenoxy, alkyd, vinylidene chloride, vinyl alkyd, isocyanate and acrylic.

6. The coating composition of claim 5 which also comprises a quantity of thixotropic agent equal to about 0.4% to 12% by weight of said finely divided metal.

7. The coating composition of claim 6 which also comprises a quantity of a suspension agent equal to about 0.2% to 5% by weight of said finely divided metal.

8. The coating composition of claim 6 which also comprises a quantiy of a hygroscopic agent equal to about 0.2% to 12% by weight of said finely divided metal.

9. The coating composition of claim 1 which also comprises a quantity of thixotropic agent equal to about 0.4% to 12% by weight of said finely divided metal.

10. The coating composition of claim 1 which also comprises a quantity of a suspension agent equal to about 0.2% to 5% by weight of said finely divided metal.

11. The coating composition of claim 1 which also comprises a quantity of a hygroscopic agent equal to about 0.2% to 12% by weight of said finely divided metal.

12. The coating composition of claim 1 wherein said active solvents comprise acetone, cellosolve acetate, methyl ethyl ketone, methyl isobutyl ketone, dimethylformamide, xylene, toluene, dibasic ester, naphtha, propylene glycol and blends thereof.

13. The coating composition of claim 1 which also comprises an inactive organic solvent selected from a group comprising aromatic hydrocarbons, alcohols and blends thereof in a quantity equal to about 10% to 40% by weight of organic solvents.

14. The coating composition of claim 1 wherein said organic solvents comprise a quantity equal to about 20% to 300% by weight of all of said resins.

15. The coating composition of claim 1, wherein said coating is for application to and curing on a metal substrate having been pretreated with a conversion coating.

16. The conversion coating of claim 15, which comprises at least one selected from the group of phosphate, chromate and oxide coatings.

17. A coating composition for application to and curing on a steel substrate to provide a drawable and corrosion resistant film protecting the steel substrate, comprising: a finely divided metal of a group consisting essentially of zinc, aluminum, magnesium, cadmium, stainless steel, copper, nickel and alloys and blends thereof; said finely divided metal having an average particle size not greater than about 60 microns and a maximum individual particle size not greater than 100 microns; a resin system at least 50% by weight consisting essentially of primary resin of a group of the family of epozy, phenoxy, alkyd, saran, vinyl alkyd, polyester, isocyanate and acrylic resins; the quantity of said resin system being about 10% to 525% by weight of said finely divided metal and said resin system having the property of curing to a dry film within 50 minutes on a substrate having a maximum temperature not greater than 500° F.; a drawable polymeric component consisting essentially of a quantity of a tetrafluoroethylene polymer in the form of solid particles equal to at least 5% of the total solids of the composition by weight and which is dispersed as solid particles in the dry film; an active organic solvent and a total quantity of all solvents being sufficient for the composition to have a viscosity in the range of 20 to 280 seconds in a Ford No. 4 cup.

18. A coating composition for application to and curing on a steel substrate to provide a drawable and corrosion resistant dry film protecting the steel substrate, comprising: a finely divided metal of a group consisting essentially of zinc, aluminum, magnesium, cadmium, stainless steel, copper, nickel and alloys and blends thereof; said finely divided metal having an average particle size not greater than about 60 microns and a maximum individual particle size not greater than 100 microns; a resin system at least 50% by weight consisting essentially of primary resin, the quantity of said resin system being about 10% to 525% by weight of said powdered metal and said resin system having the property of curing to a dry film within 50 minutes on a steel substrate at a maximum temperature not greater than 500° F.; a drawable polymeric component consisting essentially of a quantity of a tetrafluorethylene polymer in the form of solid particles equal to at least 1% total solids by weight and which is dispensed as solid particles in the dry film; an active organic solvent and a total quantity of all solvents being sufficient for the composition to have a viscosity in the range of 20 to 280 seconds in a Ford No. 4 cup; and the composition has all four properties of curing to a dry film on a steel substrate at a temperature of not greater than 500° F., adhering to the steel substrate during cold forming thereof, having sufficient lubricity to enable deep draw cold forming of the steel substrate without using an additional die lubricant, and after cold forming of the steel substrate providing salt spray corrosion resistance of at least 240 hours with a 5% neutral salt spray at room temperature.

* * * * *